Nov. 8, 1966  E. J. GALARNEAU  3,283,437
FISHING ROD HOLDER
Filed June 18, 1964
Fig. 1
Fig. 2
Fig. 3
Fig. 4
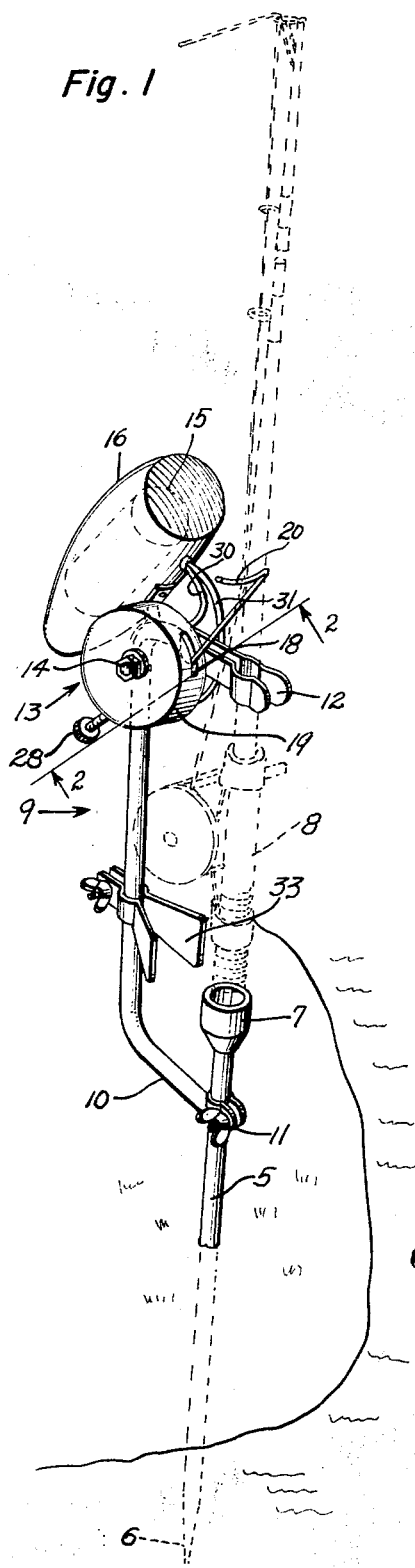
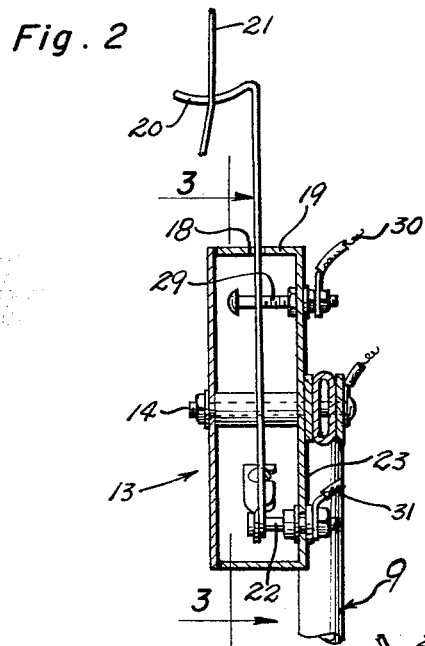
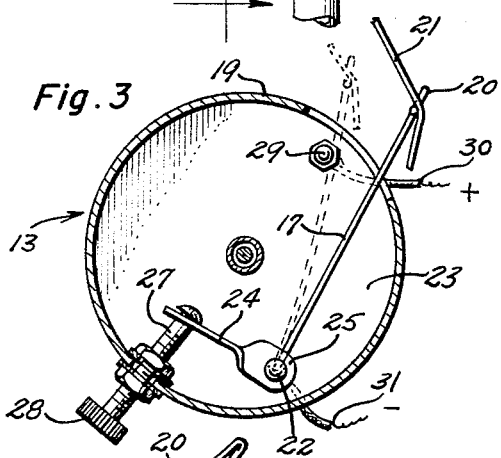
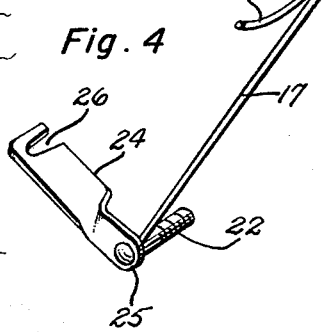
INVENTOR
Edward J. Galarneau United States Patent Office 3,283,437

Patented Nov. 8, 1966

3,283,437

FISHING ROD HOLDER

Edward J. Galarneau, 1825 8th Ave. S., Great Falls, Mont.

Filed June 18, 1964, Ser. No. 376,161

1 Claim. (Cl. 43—17)

This invention relates to fishing tackle and, more particularly, to a specially designed piece of fishing tackle that will support the fishing rod when there is no natural holder for the rod.

Fishermen have always been handicapped by lack of a suitable holder for their rod, when fishing from the bank of a stream along which there are no rocks or trees against which they can lean their fishing rod. Some fishermen have attempted ot overcome this handicap by the use of makeshift devices that have nearly always proved to be of questionable value.

It is, therefore, the prinicipal object of this invention to provide a fishing rod holder that can have one end stuck into the ground for the support of the fishing rod and its reel.

Another object of this invention is to provide a fishing rod holder that is equipped with a sounding device that will alert one when a fish has bitten the hook.

Another object of this invention is to provide a fishing rod holder that is fully adjustable, in order to accommodate any fishing rod and reel.

Another object of this invention is to provide a fishing rod holder equipped with an electric horn, having a self-contained battery, for automatically telling one when a fish has taken the hook.

Still another object of this invention is to provide a fishing rod holder and sounding device that has a minimum number of parts and is, therefore, both low cost in manufacturing and one that can retail at a price every fisherman can afford.

Novel features of construction and operation of the device will be more clearly apparent during the course of the following description, reference being had to the accompanying drawings wherein has been illustrated the preferred forms of the device and wherein like characters of reference are employed to denote like parts throughout the several figures.

In the drawings:

FIGURE 1 is a pictorial view of this invention in actual use. The fishing rod is shown in phantom lines.

FIGURE 2 is a sectional view taken along line 2—2 of FIGURE 1, of a slight modification in which the adjusting screw is displaced from the position shown in FIGURES 1 and 3.

FIGURE 3 is a sectional view taken along line 3—3 of FIGURE 2.

FIGURE 4 is a pictorial view of the movable mechanism in the case portion of this invention.

Referring to the drawing, and particularly to FIGURE 1, it will be seen that the reference number 5 indicates a tubular holder having a pointed lower end 6 and an enlarged cupped end 7 in which is placed the handle of the fishing rod that is indicated by dash lines and the numeral 8 in FIGURE 1 of the drawing where it is also seen that a C-shaped frame 9 is also formed from a tube. Said C-shaped frame 9 having a vertical section and upper and lower horizontal legs, the lower horizontal leg 10 adjustably secured to the holder 5, and the upper leg being shorter than the lower leg and provided with an extension in the form of a snap on clip 12 that secures this part of the invention to the aforesaid fishing rod 8. A case 13 that is round when viewed from the front or rear, and which is preferably, thought not absolutely necessarily, made of plastic is secured to the upper end of the aforesaid C-shaped frame 9 by the same bolt 14 that secures the snap-on clip 12 to the often mentioned C-shaped frame 9.

The case 13 provides support and protection for the electric contact mechanism that activates the bicycle-type of electric horn 15 that is enclosed within the tubular open end case 16 which is suitably mounted on the upper end of the aforesaid C-shaped frame 9. The aforesaid bicycle-type of electric horn 15 contains the necessary electric batteries for the production of sound when activated by the aforesaid electric contact mechanism that consists of a rigid wire 17 which projects upwardly through the elongated opening 18 in the periphery 19 of the aforesaid case 13 and terminates in a right angle concaved end 20 that rests against the fishing cord 21. The lower end of the aforesaid rigid wire 17 is swingably secured to the bolt 22 that projects at right angle from the inside of the wall 23 of the case 13. An adjusting bar 24 has one end 25 secured to the rigid wire 17 and swingably secured to the same bolt 22 and its other end being provided with a U-shaped recess 26 that permits engagement of the adjusting bar 24 with the upper end 27 of the adjusting screw 28 that projects through the aforesaid periphery 19 of the often mentioned case 13.

An electrical contact screw 29 also projects inwardly from the wall 23 of the case 13 in order that the aforesaid rigid wire 17 will press against the same when this wire is moved by the fishing cord 21 acting against the concaved end 20 of the rigid wire 17 when a fish is caught on the hook that is secured to the outer end of the fishing cord 21. The second electrical contact in the case 13 is, of course, the aforesaid bolt 22. A wire 30 connects the positive terminal of the electric battery of this invention with the aforesaid electrical contact screw 29, while a wire 31 connects the negative portion of the electric circuit with this electric contact mechanism.

The way in which this novel fishing rod holder works is quite clear when one examines the appended drawing where FIGURE 1 illustrates the device in use and FIGURE 3 illustrates the internal mechanism in the case 13. In this view the fishing cord 21 is shown in solid lines in the position it will be before it is pulled by a fish caught on the hook. In this position the rigid wire 17 is away from, and not in contact with, the electrical contact screw 29. The moment the fish tugs on the cord 21, it, the cord, which is shown in phantom lines in this tugged position, will pull the rigid wire 17 over until it is in contact with the aforesaid electrical contact screw 29. This just mentioned contact position of the rigid wire 17 is also shown in phantom lines. The second the electrical contact is made by the rigid wire 17 touching the electrical contact screw 29 the current will flow through the electric wires 30 and 31 to complete the circuit and thus cause the aforesaid horn 15 to blow and thereby notify the fisherman that he has a bite on his line. The horn 15 can be replaced with a bell, light, or some other type of indicator if it is so desired.

A second adjustable clip 33 is shown secured to the normally vertical or nearly vertical portion of the aforesaid D-shaped frame 9 that can be used to hold the reel of the fishing line as will be required with some types of tackle.

It will be noted that practically every detailed part of this invention is adjustable by reason of the screw construction of the invention and therefore there is little or no fishing rod or reel on the market, or even of the home-made variety, that cannot be used with this fishing rod holder that I have invented.

It is to be understood that the invention is not limited to the precise constructions shown, but that changes are contemplated as readily fall within the spirit of the invention as shall be determined by the scope of the subjoined claim.

Having described my invention, what I claim as new and desire to secure by Letters Patent is:

A fishing rod holder of the character described comprising in combination, a tubular member having a pointed lower end and an enlarged upper end in the form of a cup, a C-shaped frame having a lower horizontal leg adjustably attached to said tubular member and an upper horizontal leg projecting above the upper end of said tubular member, said upper leg terminating in a resilient clip, a fishing rod having its butt section inserted into said cup and being engaged intermediate its ends by said clip; an electric signal means mounted on said C-shaped frame, said signal means including a pivotally mounted, rigid wire-type switch member which includes a concave portion engaging a fishing line provided on said fishing rod, said switch member normally being in an electrically open position and being adapted to be moved to an electrically closed position by a force applied to said line.

References Cited by the Examiner
UNITED STATES PATENTS

| | | | |
|---|---|---|---|
| 2,634,538 | 4/1953 | Sader et al. | 43—17 |
| 2,948,076 | 8/1960 | Patricello | 43—17 |

ABRAHAM G. STONE, *Primary Examiner.*

R. L. HOLLISTER, *Assistant Examiner.*